Figure 6:
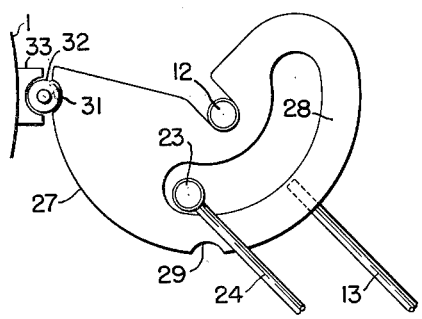

Jan. 16, 1962   J. R. HULL   3,016,978
DEHYDRATOR
Filed Jan. 9, 1958   2 Sheets-Sheet 1
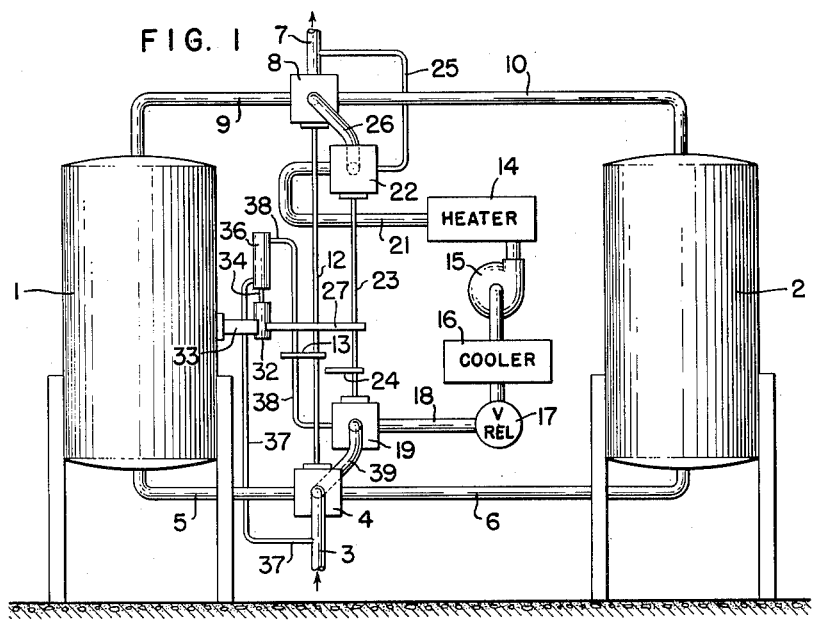

Jan. 16, 1962  J. R. HULL  3,016,978
DEHYDRATOR

Filed Jan. 9, 1958  2 Sheets-Sheet 2

United States Patent Office 3,016,978
Patented Jan. 16, 1962

3,016,978
DEHYDRATOR
John R. Hull, Feasterville, Pa., assignor to Selas Corporation of America, Dresher, Pa., a corporation of Pennsylvania
Filed Jan. 9, 1958, Ser. No. 708,040
8 Claims. (Cl. 183—4.1)

The present invention relates to dehydrators, and more particularly to apparatus for reversing them or for switching the flow of gas being dried from one tower to another when the system is operating under pressure.

Dehydrators for continuous industrial use usually consist of two towers that are filled with a desiccant such as silica gel. While one tower is being used to dry air, or other gas the desiccant in the other tower is being reactivated, or having the moisture adsorbed thereby removed. Ordinarily the reactivating cycle takes place at atmospheric pressure. These towers are connected together by suitable piping and valves so that by the manipulation of the valves air can be directed without interruption from one tower to the other.

When a dehydrator is being operated under pressure a serious pressure surge occurs in the gas line as the flow of gas is switched from one tower to the other at the beginning of each reactivation cycle. This is due to the fact that the tower being placed on stream is at a pressure which is different from, and usually considerably less than, the tower which has been drying the gas. Such a pressure surge can be highly objectionable in many processes.

It is an object of this invention to provide apparatus for reversing, or initiating a reactivation cycle in, a dehydrator without a surge in pressure in the system. It is a further object of the invention to provide means to prevent removing the active tower of a dehydrator from use until the pressure within the inactive tower is equal to the pressure in the system.

In practicing the invention, means including a pneumatic lock actuated by the pressure in the system, is provided to prevent switching a reactivated tower in the line until the pressure in that tower has been brought up to line pressure.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 shows the dehydrator and the piping arrangement connecting the two towers;

FIGS. 2 to 9 inclusive, are diagrammatic showings of the positions of the various parts as the dehydrator is in operation and during a reversal thereof.

Referring to the drawings there is shown a dehydrator including a pair of drying towers 1 and 2. A supply of air or other gas under pressure that is to be dried is introduced to the dehydrator through a pipe 3 to one port of a four-way valve 4. Other ports of this valve are connected by pipes 5 and 6 to the inlet of the dehydrator towers. The outlet for the dried air or other gas is shown at 7 and is supplied through one port of a second four-way valve 8. Other ports of this valve are connected by pipes 9 and 10 to the respective towers 1 and 2. The valves 4 and 8 are of the conventional rotary plug type and their plugs are connected by an operating rod 12 having a handle 13 thereon. As this handle is moved the valve plugs will be adjusted in unison to connect various pipes as described below.

Each tower during its reactivating cycle may be heated and cooled by placing it in a closed circuit including a heater 14 and circulating fan 15, a cooler 16 and a large area low pressure relief valve 17. The inlet line to valve 17 is indicated at 18 as being connected to one port of a four-way valve 19. The discharge of heater 14 is connected by a pipe 21 to one port of a three-way valve 22 that serves to bring the pressure in the tower being reactivated to atmospheric. Valves 19 and 22 are also of the rotating plug type and have their plugs connected by a rod 23 that can be rotated by a handle 24. Valve 22 has one port connected by a pipe 25 with the outlet 7 and has its third port connected to a port of valve 8 by means of a pipe 26.

Locking mechanism to control the sequence by means of which the valve actuating rods may be rotated during a reversal of the dehydrator include a cam 27 which is attached to rod 12 and which is provided with an opening 28 (FIG. 2) through which rod 23 extends. This cam is provided with a pair of notches 29 and 31 which are engaged at times by a stop 32 to prevent rotation of the cam except when this stop is removed from the notches. This stop is shown as being backed up by a backing plate 33 that for convenience, extends outwardly from the side of the tower 1. The stop is fastened to the lower end of a piston rod 34 having a piston 35 therein. The piston is received in a cylinder 36, the lower end of which is connected by a pipe 37 to the inlet line 3. The upper end of the cylinder is connected by a pipe 38 to one port of valve 19. The third port of valve 19 is connected by a pipe 39 to a port of valve 4 and the fourth port of valve 19, which is not shown in FIG. 1, is connected to the atmosphere.

In the operation of a dehydrator of the type disclosed herein, air to be dried is directed through one of the towers which contains a desiccant such as silica gel, for example, which adsorbs the moisture from the air. During the time that one tower is on stream and dehumidifying the air, the desiccant contained in the other tower is heated to drive off the moisture that has been adsorbed thereby and is then cooled to normal temperatures. By the time this reactivating cycle has taken place the desiccant in the first tower needs reactivation so that the flow of air is switched from the first tower to the second in order that the desiccant in the first tower can be reactivated. If the air that is being dried is under pressure it is desirable to raise the pressure in the second tower to equal that in the air line prior to the time that this tower is placed on stream. The manner in which the various valves are adjusted in order to accomplish a reversal of the system, and the position of the cam 27 and the locking mechanism associated therewith, is disclosed in FIGS. 2 to 9 inclusive, and will now be described.

Referring to FIG. 3, it will be seen that valves 4 and 8 are adjusted so that inlet 3 and outlet 7 are connected to tower 1 which is then on stream. Tower 2 is being reactivated so that its inlet 10 is connected through valves 8 and 22 to heater 14 and cooler 17. The heater is energized and blower 15 first blows heated air through tower 2 to vaporize the moisture which has been adsorbed by the desiccant therein. This increases the pressure in the system which is relieved through relief valve 17 to permit escape of the moisture. After all of the moisture has been removed from the desiccant, the heater is turned off either manually or by suitable automatic controls and the cooler is turned on to circulate cooled air through the system and cool the desiccant in tower 2 to normal temperatures so that it will be ready to dry air that is forced through it. By the time the desiccant in tower 2 is cooled it is time to reverse the system. It will be noted in FIG. 2, that while tower 1 is on stream the pressure in line 3 is applied through pipe 37 to the lower end of cylinder 36, thereby keeping stop 32 in notch 29. This prevents rotation of actuating link 12 and thereby locks valves 4 and 8 so that the tower 1 is maintained on stream. The upper end of cylinder 36 is connected through pipe 38 and valve 19 to the atmosphere.

When it is time to reverse the system, handle 24 is moved to rotate the plugs of valves 19 and 22 to the position shown in FIGS. 4 and 5 of the drawings. At this time the upper end of cylinder 36 is connected through pipe 38, valve 19 and pipe 6 with the interior of tower 2. Simultaneously adjustment of valve 22 has connected the top of tower 2 through pipe 10, valve 22 and pipe 25 with the outlet pipe 7. Therefore, line pressure is applied to tower 2. As this pressure builds up, pressure in cylinder 36, on the opposite side of piston 35, is built up. Since the area on the upper side of the piston is larger than the other side due to the area of piston rod 34, the piston will begin to move in the cylinder to move stop 32 out of notch 29. By the time the pressure in tower 2 is equal to that in the line, the piston will have moved its full stroke to remove stop 32 from notch 29 so that rod 12 can be rotated.

Figure 8:
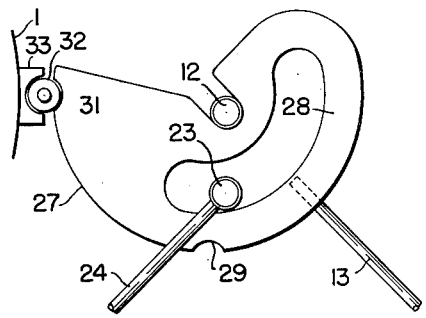
Figure 7:
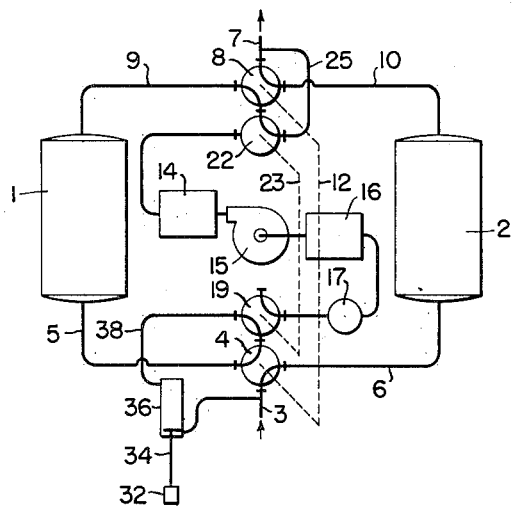
Figure 9:
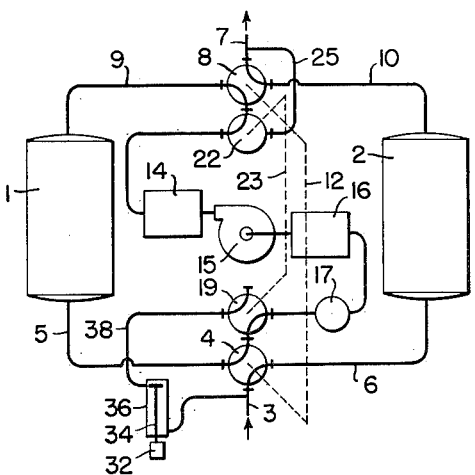

At this time handle 13 is operated to move rod 12 and adjust the valves 4 and 8 to the position shown in FIGS. 6 and 7 of the drawings. It will be seen that this adjustment of these two valves places tower 2 directly in the line between inlet 3 and outlet 7 and places tower 1 in the same condition that tower 2 is shown in in FIG. 5. Thereafter handle 24 is moved to rotate rod 23 and adjust valves 19 and 22 back to the positions of FIG. 3 as shown in FIGS. 8 and 9. This adjustment of valve 19 connects the upper end of cylinder 36 to the atmosphere so that line pressure from inlet 3 can be applied to the lower end of cylinder 36 thereby moving stop 32 upwardly into position in which it is engaging notch 31 of cam 27, thus locking this cam in position and tower 2 in the line. The same adjustment of valve 19 and the concurrent adjustment of valve 22 connects tower 1 in series with heater 14, fan 15 and cooler 16 so that this tower can be reactivated in its normal sequence.

From the above it will be seen that the tower which is on stream cannot be removed and the tower which has been reactivated cannot be placed on stream until the pressure in the reactivated tower has been equalized with that of the line pressure. Thus, when the system is reversed, the tower which will begin the drying function is at line pressure and there will be no surge in the line due to placing the tower suddenly in the system. It is possible with the arrangement shown to reactivate the individual towers at atmospheric pressure and at the same time insure that they will be at line pressure before they are placed into service. It will be obvious that the reactivating of each tower including the heating and cooling of the desiccant therein, can be controlled either manually or automatically, both of which are conventional at the present time.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In a dehydrator, the combination of a pair of towers with a desiccant therein that are adapted to operate under pressure, reactivating means, a first pair of valves, a second pair of valves, piping connecting said valves, towers and reactivating means, first means to adjust said first pair of valves from a first position in which one tower is connected in a line through which a gas to be dried flows to a second position in which the other tower is connected in said line, second means to adjust said second pair of valves from a first position in which the tower not connected to said line is connected to said reactivating means to a second position in which said tower has line pressure applied to it, locking means normally to prevent operation of said first adjusting means to its second position until said second adjusting means has been shifted to its second position, and line pressure responsive means to move said locking means to unlocking position operative in response to adjustment of said second adjusting means to its second mentioned position.

2. In a dehydrator, the combination of a pair of towers containing a dehydrating material, piping forming a portion of a fluid line under pressure to supply a fluid to be dried to and from said towers, a tower reactivating mechanism, a plurality of valves in said piping operative to connect alternately one of said towers to said fluid line and the other to said mechanism, means to actuate said valves including a first means to adjust said valves to apply pressure of said fluid line to the tower that has been connected to said mechanism and a second means to adjust said valves to connect the tower that has been connected to said mechanism in said fluid line and connect the other tower to said mechanism, a fluid operated locking means engaging said second valve adjusting means and normally operative to prevent operation of said second adjusting means, and means including one of said valves through which pressure is applied to said locking means to release the same when said first adjusting means is adjusted to apply pressure to a tower.

3. In a dehydrator, the combination of a pair of towers having a desiccant therein and adapted to be operated under pressure, a reactivating mechanism, a first pair of valves operative to connect alternately said towers to a line through which a gas to be dried flows and said reactivating mechanism, a second pair of valves operative to complete the connection of a tower to said reactivating mechanism or to apply the pressure of said line to said tower, means to lock said first pair of valves in adjusted position, and means responsive to adjustment of said second pair of valves to a position to apply the pressure of the line to the tower which is not in said line to release said locking mechanism.

4. In a dehydrator, the combination of a pair of towers, each containing a desiccant, means forming a line through which a gas under pressure flows, a pair of valves in said line operative to direct the flow of gas through one tower or the other, means to adjust said valves simultaneously to control the direction of gas flow, a third valve operative to connect one tower or the other to said line, locking means operative to prevent operation of said means to adjust, means to operate said third valve to connect one tower with said gas line when gas is flowing through the other tower, and means responsive to the application of line pressure to said one tower to release said locking means.

5. In a dehydrator, a pair of towers each having a desiccant therein, means to supply a gas under pressure to be dried alternately through said towers including a plurality of valves to direct gas through one tower or the other, a third valve through which the gas under pressure can be applied to one tower or the other, first means to operate said plurality of valves, second means to operate said third valve, locking means normally operative to prevent operation of said first means and mechanism operative upon adjustment of said second valve actuating means to a position in which gas pressure can be applied to one tower and upon application of the pressure of the gas to one tower to release said locking means whereby said first valve actuating means can be operated to adjust said pair of valves to shift the flow of gas to said one tower.

6. The combination of claim 5 in which said mechanism includes a cylinder and a piston received in said cylinder connected to said locking means, a fluid connection between said towers and said cylinder, an additional valve in said fluid connection operative to connect one or the other of said towers to said cylinder, and means operated by said second valve adjusting means to adjust said additional valve to connect said cylinder to said one tower when gas pressure is applied to said one tower.

7. In an adsorbing apparatus, the combination of a pair of towers containing a body of adsorbing material, a line through which a fluid to be treated flows under pressure, a first pair of valves in said line operative to direct fluid alternately through said towers, a fluid circuit including reactivating mechanism, means in said circuit to maintain the pressure therein substantially atmospheric, a second pair of valves and connections associated therewith to connect said fluid circuit through said first pair of valves to the tower not connected to said line, a connection between one of said second pair of valves and said line, means to adjust said first pair of valves, a lock to prevent operation of said adjusting means, means to adjust said second pair of valves between a first position in which one tower is connected through said connection to said line and a second position in which a tower is connected to said circuit, and means responsive to adjustment of said second pair of valves to their first position to release said lock whereby said means to adjust said first pair of valves can be operated.

8. Adsorption apparatus comprising a pair of towers containing a supply of adsorbing material, a line through which a fluid to be treated flows under pressure, a pair of valves in said line adjustable to connect one or the other of said towers in said line, reactivating mechanism including means to maintain said mechanism substantially at atmospheric pressure, connections including a third valve adjustable between a first position to connect said reactivating mechanism to the tower not in said line and a second position to apply line pressure to the tower not in said line, means to adjust said first pair of valves, means to lock said first pair of valves to prevent adjustment thereof, and means responsive to application of line pressure to the tower not connected to said line when said third valve is in its second position to release said means to lock.

References Cited in the file of this patent
UNITED STATES PATENTS

| | | |
|---|---|---|
| 2,234,795 | Brown | Mar. 11, 1941 |
| 2,699,837 | Van Note | Jan. 18, 1955 |
| 2,709,452 | Calabrese | May 31, 1955 |
| 2,748,800 | Allen | June 5, 1956 |
| 2,800,197 | WynKoop | July 23, 1957 |
| 2,815,089 | Turner | Dec. 3, 1957 |
| 2,823,764 | Miller | Feb. 18, 1958 |
| 2,880,818 | Dow | Apr. 7, 1959 |